United States Patent [19]

Miyoshi et al.

[11] Patent Number: 4,474,843

[45] Date of Patent: Oct. 2, 1984

[54] MAGNETIC RECORDING MEDIUM

[75] Inventors: Takahito Miyoshi; Toshimitu Okutu; Masaaki Fujiyama, all of Kanagawa, Japan

[73] Assignee: Fuji Photo Film Co., Ltd., Kanagawa, Japan

[21] Appl. No.: 292,851

[22] Filed: Aug. 14, 1981

[30] Foreign Application Priority Data

Aug. 18, 1980 [JP] Japan .................................. 55-112721
Aug. 18, 1980 [JP] Japan .................................. 55-112722

[51] Int. Cl.$^3$ .............................................. G11B 5/78
[52] U.S. Cl. ................................ 428/212; 360/134; 360/135; 360/136; 427/127; 427/128; 427/131; 428/220; 428/323; 428/325; 428/328; 428/329; 428/330; 428/331; 428/694; 428/695; 428/900
[58] Field of Search ................................ 427/127–132; 428/212, 220, 323, 325, 328, 329, 330, 331, 694, 695, 900; 252/62.54; 360/134–136

[56] References Cited

U.S. PATENT DOCUMENTS

| | | | |
|---|---|---|---|
| 4,015,042 | 3/1977 | Chassaigne | 428/325 |
| 4,146,031 | 3/1979 | Fujiyama et al. | 428/323 |
| 4,189,514 | 2/1980 | Johnson | 428/695 |
| 4,367,261 | 1/1983 | Miyoshi | 428/900 |
| 4,411,953 | 10/1983 | Miyoshi | 428/694 |
| 4,414,270 | 11/1983 | Miyoshi | 428/694 |
| 4,419,406 | 12/1983 | Isobe | 428/694 |

*Primary Examiner*—Ellis P. Robinson
*Attorney, Agent, or Firm*—Sughrue, Mion, Zinn, Macpeak and Seas

[57] ABSTRACT

A magnetic recording medium is described comprising a magnetic layer on one surface of a non-magnetic base and a back coating on the other surface of the base, said back coating being not more than $2\mu$ thick and which contains an inorganic powder and a binder, said inorganic powder consisting of fine particles of an average size of from 0.01 to $0.1\mu$ and coarse particles of an average size of from 0.1 to $0.8\mu$.

19 Claims, No Drawings

MAGNETIC RECORDING MEDIUM

FIELD OF THE INVENTION

This invention relates to a magnetic recording medium, and more particularly, to a magnetic tape that has high S/N ratio (signal to noise ratio), low friction coefficient, high running durability, and which is resistant to bending of edges and to scraping of back coating.

BACKGROUND OF THE INVENTION

Audio, video and computer magnetic recording tapes have a magnetic recording layer with its surface made highly smooth to provide improved sensitivity (particularly, high output in the high-frequency range). The transport properties of these tapes are adversely affected and their output varies due to variations in tension and other factors. Tap deformation or damage also occurs easily. To eliminate these defects, a magnetic recording tape has been proposed that has a back coating formed on a base on the other side of the magnetic recording layer. However, it frequently occurs that the conventional back coating is scraped, has an increased friction coefficient, or develops bends at the edges, and these defects are conspicuous when a thin base having good surface properties is used to make a magnetic tape whose total thickness is less than $20\mu$. Thus, the conventional back coating requires further improvements in quality.

When a magnetic recording (especially in a tape form) with a back coating formed to provide improved transport properties and durability is wound into a roll (tape form) or stacked in sheets, the pattern of unevenness of the surface of the back coating is transferred onto the surface of the magnetic recording layer to impair its surface characteristics, and hence the electromagnetic properties, especially the S/N characteristics, of the magnetic recording medium are deteriorated. To provide the back coating with good transport properties, which is regarded as one of the most important features of the back coating, the coating is often treated to provide a rough surface, and if the resulting magnetic medium is stored in the form of a tape roll or stacked in sheets, the unevenness of the surface of the back coating is transferred onto the surface of the magnetic layer, and this is a major cause of reduction in the S/N characteristics of the magnetic recording medium.

SUMMARY OF THE INVENTION

Therefor, one object of this invention is to provide a highly durable magnetic recording medium that uses a non-magnetic base having good surface characteristics and which is capable of forming a magnetic tape in a total thickness of less than $20\mu$ that is free from the increase of friction coefficient, the scraping of the back coating and bending of the tape edges.

Another object of this invention is to provide a magnetic recording medium having a back coating having good surface characteristics, including a center line average roughness (Ra) of not more than $0.024\mu$ (cutoff value=0.08 mm), without any adverse effect on the S/N characteristics of the magnetic medium.

A further object of this invention is to provide a highly durable magnetic recording medium the friction coefficient of which is not increased during service.

These objects of this invention can be achieved by a magnetic recording medium having a magnetic layer on the surface of a non-magnetic base and a back coating on the other surface of the base, said back coating being not more than $2\mu$ thick and comprising an inorganic powder and a binder, said inorganic powder consisting essentially of fine particles of an average size of from 0.01 to $0.1\mu$ and coarse particles of an average size of from 0.1 to $0.8\mu$, provided that the two types of particles have different average sizes.

The magnetic recording medium of this invention differs from conventional mediums in that it uses a more smooth base with good surface properties, has a thin back coating of not more than $2\mu$ which contains particles projecting to a height of not more than $0.8\mu$ and whose surface roughness is not more than $0.024\mu$ (cutoff value=0.08 mm) in terms of center line average roughness (Ra). Another feature of this invention is that the back coating has low friction coefficient (not more than $0.24\mu$).

DETAILED DESCRIPTION OF THE INVENTION

The back coating contains particles of inorganic powder to modify its surface roughness and electrical resistance characteristics.

The fine particles that are one component of the inorganic powder used in this invention have an average size of from 0.01 to $0.1\mu$, preferably from 0.03 to $0.08\mu$, and particularly preferably from 0.06 to $0.08\mu$. The coarse particles that are the other component of the inorganic powder have an average size of from 0.1 to $0.8\mu$, preferably from 0.2 to $0.6\mu$, and particularly preferably from 0.3 to $0.4\mu$. The term "size" herein means the largest cross-sectional dimension. These particles project from the surface of the back coating to a height of not more than $0.8\mu$, preferably not more than $0.4\mu$, and particularly preferably not more than $0.2\mu$. The coarse particles are mixed with the fine particles in a coarse/fine volume ratio which is preferably 1/10 or less, particularly preferably 1/20 or less, and most preferably from 1/1,000 to 1/50.

Examples of inorganic powders that is used in this invention include particles of $CaCO_3$, $Al_2O_3$, $SiO_2$, $Fe_2O_3$, $TiO_2$, $MgO$, $ZnO$ and $CaO$. A small amount of other particulate material may be used therewith for lublication and other purposes, and examples include carbon black powder, graphite, tungsten disulfide, and boron nitride. The fine particles may be made of a material which is the same as or different from the material of the coarse particles. Preferably the two particles are made of different materials. In view of an average size of particles which are readily available, the coarse particles are preferably made of $Al_2O_3$, $MgO$, $ZnO$ or $CaO$, particularly preferably $Al_2O_3$, and the fine particles are preferably made of $SiO_2$, $CaCO_3$ or $TiO_2$, most preferably $CaCO_3$.

The binder used in this invention may be made of a known type such as thermoplastic resin, thermosetting resin or reactive resin, or mixtures thereof. Examples of the thermoplastic resin include vinyl chloride-vinyl acetate copolymer, vinyl chloride/vinylidene chloride copolymer, vinyl chloride/acrylonitrile copolymer, acrylic ester/acrylonitrile copolymer, acrylic ester/vinylidene chloride copolymer, acrylic ester/styrene copolymer, methacrylic ester/acrylonitrile copolymer, methacrylic ester/vinylidene chloride copolymer, methacrylic ester/styrene copolymer, urethane elastomer, polyvinyl fluoride, vinylidene chloride/acrylonitrile copolymer, butadiene/acrylonitrile copolymer, polyamide resin, polyvinyl butyral, cellulosic resin (e.g., cellulose acetate butyrate, cellulose diacetate, cellulose propionate, and nitrocellulose), styrene/butadiene copolymer, polyester resin, chlorovinyl ether/acrylic ester copolymer, amino resin and various rubber resins. Examples of the thermosetting or reactive resin are phenolic resin, epoxy resin, polyurethane hardening resin, urea resin, melamine resin, alkyd resin, acrylic reactive resin, polyisocyanate, and polyamine.

A preferred binder combination is a cellulosic resin, a thermoplastic polyurethane elastomer, a saturated polyester resin, and a polyisocyanate.

A suitable example of the cellulosic resin used in the preferred embodiment is a cellulose derivative such as nitrocellulose and cellulose derivatives which are effective in providing high heat resistance, toughness and blocking resistance.

Commercially available thermoplastic polyurethane elastomers can be used, such as polyester polyurethane resins produced by first reacting organic dibasic acids (e.g., phthalic acid, adipic acid, dimerized linoleic acid, and maleic acid) with glycols (e.g., ethylene glycol, propylene glycol, butylene glycol and diethylene glycol) or polyhydric alcohols (e.g., trimethylolpropane, hexanetriol, glycerin, trimethylolethane and pentaerythritol) and treating the resulting polyester polyols with polyisocyanate compounds (e.g., tolylenediisocyanate, 4,4'-diphenylmethanediisocyanate, hexamethylenediisocyanate and metaxylylenediisocyanate), polyether polyurethane resins, and compounds which have the ring

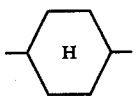

in the molecule represented by formula (I):

wherein m is an integer of 5 to 100, R is a divalent group that is introduced by an alicyclic or aromatic compound having at least two hydroxyalkyl groups having from 1 to 4 carbon atoms or at least two hydroxyalkoxyl group having from 1 to 4 carbon atoms, R' is

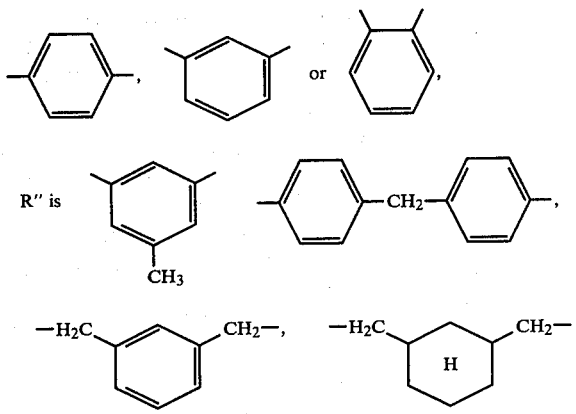

or $-(CH_2)_n$ wherein n is an integer of 4 to 6. These thermoplastic polyurethane elastomers are particularly effective when they have a molecular weight of 5,000 to 500,000, preferably 10,000 to 200,000. For details of these polyurethane elastomers, see Japanese Patent Application No. 26880/79.

Examples of the saturated polyester resin include polycondensates of dibasic acids and divalent alcohols, and those produced by first depolymerizing polyethylene terephthalates and polymerizing the resulting product together with an additional diol component. Commercially available saturated polyester resins include Viron #200, #290, #300, and #500 of Toyobo Co., Ltd., as well as Stafix P-LB of Fuji Photo Film Co., Ltd.

Examples of the polyisocyanate are 2,4-tolylenediisocyanate, 1,6-hexamethylene diisocyanate and triisocyanate (e.g., "Collonate L" of Nippon Polyurethane Industry Co., Ltd.).

The composition of the binder used in this preferred embodiment is preferably from 20 to 80% by weight (more preferably from 30 to 60% by weight) cellulosic resin, from 20 to 60% by weight (more preferably from 30 to 50% by weight) thermoplastic polyurethane elastomer, from 1 to 20% by weight (more preferably from 1 to 10% by weight) saturated polyester resin, and from 10 to 50% by weight (more preferably from 20 to 40% by weight) polyisocyanate based on the total weight of the binder.

The weight ratio of the inorganic powder to the binder used in the back coating of this invention is preferably from 2.5/1 to 0.1/1, and most preferably from 1.5/1 to 0.8/1. The back coating of this invention is selected so that the total thickness of the resulting magnetic recording medium (magnetic layer+base+back coating layer) is as thin as possible, to provide higher recording density for a given volume. To achieve this purpose, the back coating preferably has a thickness of from 0.3 to 2μ, and particularly preferably from 0.5 to 1μ.

According to this invention, a magnetic recording medium having the characteristics described above is produced. A thin back coating prepared by the conventional technique breaks or is scrapted as the recording medium runs, but such a problem is absent from the magnetic recording medium produced by this invention. Another advantage of the back coating of this invention is that high-density recording at a recording wavelength of 1.3μ is possible without reducing the video S/N ratio, as compared to conventional magnetic recording mediums.

The magnetic layer and the non-magnetic base in the magnetic recording medium of this invention can be prepared from the material described in Japanese Patent Application (OPI) No. 108804/77 (the symbol OPI as used herein means an unexamined published Japanese patent application) by the method described in the same application.

This invention is now described in greater detail by reference to the following examples and comparative examples, which are provided here for illustrative purposes only, and are not intended to limit the scope of this invention. In the examples, all parts are by weight.

EXAMPLE 1

A paint solution was prepared by making an intimate mixture of the following composition in a ball mill.

| | |
|---|---|
| Nitrocellulose | 35 parts |
| Polyurethane ("Nipporan 2301" of Nippon Polyurethane Industry Co., Ltd.) | 20 parts |
| Polyester ("Viron #200" of Toyobo Co., Ltd.) | 5 parts |
| Polyisocyanate ("Collonate L" of Nippon Polyurethane Industry Co., Ltd.) | 40 parts |
| CaCO₃ powder ("Homocal D" of Shiraishi Kogyo K.K.) & α-alumina powder | 100 parts |
| Methyl ethyl ketone | 480 parts |

The solution was spread on the back surface of a magnetic recording tape having on the front surface a magnetic layer comprising Co-containing γ-iron oxide, and was dried to give a back coating 0.5 to 1.0μ thick.

EXAMPLE 2

A magnetic tape was prepared as in Example 1 except that the back coating was made of a paint solution having the composition indicated below.

| | |
|---|---|
| Nitrocellulose | 35 parts |
| Polyurethane "(Nipporan 2301 of Nippon Polyurethane Industry Co., Ltd.) | 20 parts |
| Polyester ("Viron #300" of Toyobo Co., Ltd.) | 3 parts |
| Polyisocyanate ("Collonate L" of Nippon Polyurethane Industry Co., Ltd.) | 42 parts |
| CaCO₃ powder ("Homocal D" of Shiraishi Kogyo K.K.) & α-alumina powder | 100 parts |
| Methyl ethyl ketone | 480 parts |

The solution was spread and dried to give a back coating as in the case of Example 1.

COMPARATIVE EXAMPLE 1

A magnetic tape was prepared as in Example 1 except that the back coating was made of a paint solution having the composition indicated below.

| | |
|---|---|
| Vinyl chloride/vinyl acetate copolymer ("400X-110A" of The Japanese Geon Co., Ltd.) | 30 parts |
| Polyurethane ("Nipporan 2301" of Nippon Polyurethane Industry Co., Ltd.) | 15 parts |
| Polyisocyanate ("Collonate L" of Nippon Polyurethane Industry Co., Ltd.) | 25 parts |
| CaCO₃ powder ("Homocal D" of Shiraishi Kogyo K.K.) and α-alumina powder | 50 parts |
| Methyl ethyl ketone | 300 parts |

COMPARATIVE EXAMPLE 2

A magnetic tape was prepared as in Example 1 except that the back coating was made of a paint solution having the composition indicated below.

| | |
|---|---|
| Nitrocellulose | 35 parts |
| Polyurethane ("Nipporan 2301" of Nippon Polyurethane Industry Co., Ltd.) | 20 parts |
| Polyisocyanate ("Collonate L" of Nippon Polyurethane Industry Co., Ltd.) | 45 parts |
| CaCO₃ powder ("Homocal D" of Shiraishi Kogyo K.K.) and α-alumina powder | 100 parts |
| Methyl ethyl ketone | 480 parts |

Samples equivalent to the magnetic tapes prepared in Examples 1 and 2 and Comparative Examples 1 and 2 were designated as Samples A, B, C and D, respectively. They were subjected to the tests set foth below, and the results are shown in Table 1.

As Table 1 shows, the magnetic tape samples using a thin back coating that contained a nitrocellulose/polyurethane/saturated polyester/polyisocyanate binder and CaCO₃ and α-alumina powders achieved good running durability, were free from the scraping of the back coating and provided good S/N characteristics.

EXAMPLE 3

A magnetic layer comprising Co-containing γ-iron oxide (Co content: 1-10 atomic %) was formed on one side of a polyethylene terephthalate film base (14μ thick) and a back coating layer was formed on the other side of the base. The dry thickness of the magnetic layer was 5μ. The back coating layer was made of a composition having the formulation indicated below. The combination of fine and coarse particles of the inorganic powder was varied as indicated in Table 2. The dry thickness of the back coating was 1μ.

| Formulation of back coating layer | |
|---|---|
| Nitrocellulose | 25 parts |
| Polyurethane ("Nipporan 2301" of Nippon Polyurethane Industry Co., Ltd.) | 15 parts |
| Polyisocyanate ("Collonate L" of Nippon Polyurethane Industry Co., Ltd.) | 40 parts |
| Polyester ("Viron #200" of Toyobo Co., Ltd.) | See Table 2 |
| Fine inorganic particles (CaCO₃: av. size = 0.07μ) | See Table 2 |
| Coarse inorganic particles (α-alumina: av. size, see Table 2) | See Table 2 |
| Methyl ethyl ketone | 480 parts |

The resulting samples of magnetic recording tape subjected to the tests set forth below. The results are shown in Table 2.

COMPARATIVE EXAMPLE 3

A magnetic layer comprising Co-containing γ-iron oxide was formed on one side of a polyethylene terephthalate film base (14μ thick) and a back coating was formed on the other side of the base. The dry thickness of the magnetic layer was 5μ. The back coating was made of a composition having the formulation indicated below. The combination of fine and coarse particles of the inorganic powder was varied as indicated in Table 3. The dry thickness of the back coating was about 2μ.

| Formulation of back coating | |
|---|---|
| Carbon black | 300 parts |
| Polyurethane resin | 12 parts |
| Talc powder (av. size = 1.2 μ) | 300 parts |
| Talc powder (av. size = 7 μ) | See Table 3 |
| Saran resin | 180 parts |
| Isocyanate | 100 parts |
| Methyl ethyl ketone | 1,000 parts |

As Tables 2 and 3 show, the magnetic tape samples using a thin back coating that contained both fine and caorse particles of filler achieved good running durability, were free from the scraping of the back coating, and provided good S/N characteristics.

Test 1

The durability of the virgin tape sample was compared with that of the sample that had been passed through a VHS video deck 100 times. The durability was checked by measuring the tension ($T_1$) at the entrance of the rotary cylinder of the video deck and the tension ($T_2$) at the exit. The variation in audio output between the virgin tape and the tape after 100 passes was measured. The initial video S/N ratio of the sample was also checked.

Test 2

The dynamic friction coefficient ($\mu$) of the magnetic layer and the back coating was measured by running the virgin tape and the tape after 100 passes in close contact with a stainless steel pole (diameter: 5 mm) at semicircular portion thereof at rate of 3.3 cm/sec, while applying a tension of 50 g at the entrance of the stainless steel pole.

Test 3

The virgin tape was passed through a VHS video deck 100 times, and the wear of the back coating and any other tape damage were examined with naked eyes and a microscope.

Test 4

The number of dropouts occurring in one minutes in the virgin tape and the tape after 100 passes was counted.

TABLE 1

| | Sample A | Sample B | Sample C | Sample D |
|---|---|---|---|---|
| Variation in OP after 100 passes (dB) | 0.1 | 0.1 | 1.2 | 0.4 |
| Deck tension of virgin tape ($T_2/T_1$) | 70/35 | 70/35 | 100/40 | 95/40 |
| Deck tension of tape after 100 passes ($T_2/T_1$) | 65/35 | 65/35 | 95/35 | 85/35 |
| Dynamic friction coefficient of virgin tape ($\mu$) | | | | |
| Magnetic coating | 2.6 | 2.6 | 3.0 | 2.9 |
| Back coating | 1.7 | 1.7 | 2.0 | 2.1 |
| Dynamic friction coefficient of tape after 100 passes ($\mu$) | | | | |
| Magnetic coating | 2.5 | 2.5 | 2.8 | 2.7 |
| Back coating | 1.7 | 1.7 | 1.9 | 2.2 |
| Tape wear after 100 passes | Very Small | Very Small | Great | Small |
| Tape damage (bends, nicks) | Very Small | None | Great | Small |

TABLE 2

| Sample No. of Ex. | Amount of Addition of Fine Inorganic Particles (in parts) | Coarse Inorganic Particles Average Size ($\mu$) | Coarse Inorganic Particles Amount of Addition (in parts) | Amount of Addition of Viron #200 | Variation in OP after 100 Passes (dB) | Deck Tension of Virgin Tape ($T_2/T_1$) | Deck Tension of Tape after 100 Passes ($T_2/T_1$) | Initial S/N (dB) |
|---|---|---|---|---|---|---|---|---|
| 1 | 100 | 0.4 | 0 | 0 | 0.8 | 100/40 | 95/35 | 0 |
| 2 | 100 | 0.4 | 1 | 0 | <0.1 | 80/35 | 75/35 | +2 |
| 3 | 100 | 0.4 | 2 | 0 | 0.1 | 75/35 | 70/35 | +1.8 |
| 4 | 100 | 1.0 | 1 | 0 | 0.8 | 75/35 | 70/35 | +1.5 |
| 5 | 100 | 1.0 | 2 | 0 | 1.4 | 70/35 | 65/35 | +1.2 |
| 6 | 100 | 0.4 | 1 | 5 | 0.3 | 70/35 | 70/35 | +2.2 |
| 7 | 0 | 0.4 | 100 | 0 | 3.0 | 70/35 | 65/35 | −2.0 |
| 8 | 100 | 0.1 | 20 | 0 | 0.9 | 80/35 | 65/35 | −0.5 |

| Sample No. of Example | Dynamic Friction Coefficient of Virgin Tape Magnetic Coating ($\mu$) | Dynamic Friction Coefficient of Virgin Tape Back Coating ($\mu$) | Dynamic Friction Coefficient of Tape after 100 Passes Magnetic Coating ($\mu$) | Dynamic Friction Coefficient of Tape after 100 Passes Back Coating ($\mu$) | Tape Wear after 100 Passes | Tape Damage (bends, nicks) | No. of Dropouts per Minute Virgin Tape | No. of Dropouts per Minute Tape after 100 Passes |
|---|---|---|---|---|---|---|---|---|
| 1 | 0.34 | 0.24 | 0.33 | 0.25 | Great | Small | 13 | 80 |
| 2 | 0.30 | 0.17 | 0.29 | 0.20 | Very small | Very small | 12 | 15 |
| 3 | 0.30 | 0.15 | 0.29 | 0.17 | Very small | None | 12 | 18 |
| 4 | 0.30 | 0.15 | 0.29 | 0.17 | Very small | Very small | 13 | 20 |
| 5 | 0.29 | 0.15 | 0.28 | 0.17 | Very small | Very small | 13 | 25 |
| 6 | 0.30 | 0.16 | 0.29 | 0.18 | Very small | None | 10 | 12 |
| 7 | 0.30 | 0.15 | 0.29 | 0.20 | Great | Small | >100 | >100 |
| 8 | 0.30 | 0.15 | 0.29 | 0.16 | Very small | Very small | 12 | 15 |

TABLE 3

| Sample No. of Comparative Example | Talc Powder of Average Size of 7$\mu$ | Variation in OP after 100 Passes (dB) | Deck Tension of Virgin Tape ($T_2/T_1$) | Deck Tension of Tape after 100 Passes ($T_2/T_1$) | Initial S/N |
|---|---|---|---|---|---|
| 3-1 | 30 | 5.0 | 110/45 | 100/40 | −5.5 |
| 3-2 | 0 | 4.0 | 100/40 | 98/40 | −4.7 |

| Sample No. of | Dynamic Friction Coefficient of Virgin Tape Magnetic | Dynamic Friction Coefficient of Virgin Tape Back | Dynamic Friction Coefficient of Tape after 100 Passes Magnetic | Dynamic Friction Coefficient of Tape after 100 Passes Back | Tape Wear | Number of Dropouts per Minute |
|---|---|---|---|---|---|---|

TABLE 3-continued

| Comparative Example | Coating ($\mu$) | Coating ($\mu$) | Coating ($\mu$) | Coating ($\mu$) | after 100 Passes | Tape Damage (bends, nicks) | Virgin Tape | Tape after 100 Passes |
| --- | --- | --- | --- | --- | --- | --- | --- | --- |
| 3-1 | 0.33 | 0.31 | 0.30 | 0.33 | Great | Small | 40 | 45 |
| 3-2 | 0.30 | 0.20 | 0.30 | 0.25 | Great | Small | 30 | 35 |

While the invention has been described in detail and with reference to specific embodiment thereof, it will be apparent to one skilled in the art that various changes and modifications can be made therein without departing from the spirit and scope thereof.

What is claimed is:

1. A magnetic recording medium comprising:
   (A) a magnetic layer on one surface of a non-magnetic base and
   (B) a back coating on the other surface of the base, said back coating being not more than $2\mu$ thick and comprising
      (i) an inorganic powder selected from the group consisting of $CaCO_3$, $Al_2O_3$, $SiO_2$, $Fe_2O_3$, $TiO_2$, MgO, ZnO and CaO and
      (ii) a binder consisting of a cellulosic resin, a thermoplastic polyurethane elastomer, a saturated polyester resin and polyisocyanate,
   wherein said inorganic powder consists essentially of fine particles having an average size of from 0.01 to $0.1\mu$ and coarse particles having an average size of from 0.1 to $0.8\mu$, provided that the two types of particles have different average sizes, and wherein the volume ratio of the coarse particles/fine particles is 1/20 or less, and wherein the center line average roughness (Ra) of the back coating is not more than $0.024\mu$ where the cutoff value is 0.08 mm and wherein the total thickness of the magnetic recording medium is less than about $20\mu$.

2. A magnetic recording medium as in claim 1, wherein the fine particles have an average size of from 0.03 to $0.08\mu$ and the coarse particles have an average size of from 0.2 to $0.6\mu$.

3. A magnetic recording medium as in claim 1, wherein the fine particles have an average size of from 0.06 to $0.08\mu$, and the coarse particles have an average size of from 0.3 to $0.4\mu$.

4. A magnetic recording medium as in claim 1, wherein the particles project from the surface of the back coating to a height of not more than $0.8\mu$.

5. A magnetic recording medium as in claim 1, wherein the particles project from the surface of the back coating to a height of not more than $0.4\mu$.

6. A magnetic recording medium as in claim 1, wherein the particles project from the surface of the back coating to a height of not more than $0.2\mu$.

7. A magnetic recording medium as in claim 1, wherein the volume ratio of the coarse particles/fine particles is from 1/1000 to 1/50.

8. A magnetic recording medium as in claim 1, wherein the inorganic powder contains a small amount of other particulate material selected from the group consisting of carbon black powder, graphite, tungsten, disulfide, and boron nitride.

9. A magnetic recording medium as in claim 1, wherein the fine particles are made of a different material than the coarse particles.

10. A magnetic recording medium as in claim 1, wherein the coarse particles are selected from the group consisting of $Al_2O_3$, MgO, ZnO, and CaO.

11. A magnetic recording medium as in claim 1, wherein the coarse particles are $Al_2O_3$.

12. A magnetic recording medium as in claim 1, wherein the fine particles are selected from the group consisting of $SiO_2$, $CaCO_3$, and $TiO_2$.

13. A magnetic recording medium as in claim 1, wherein the fine particles are $CaCO_3$.

14. A magnetic recording medium as in claim 1, wherein the weight ratio of the inorganic powder/binder in the back coating is from 2.5/1 to 0.1/1.

15. A magnetic recording medium as in claim 1, wherein the weight ratio of the inorganic powder/binder in the back coating from 1.5/1 to 0.8/1.

16. A magnetic recording medium as in claim 1, wherein the back coating has a thickness of from 0.3 to $2\mu$.

17. A magnetic recording medium as in claim 1, wherein the back coating has a thickness of from 0.5 to $1\mu$.

18. A magnetic recording medium as in claim 1, werhein the binder contains from 20 to 80% by weight cellulosic resin, from 20 to 60% by weight thermoplastic polyurethane elastomer, from 1 to 20% by weight saturated polyester resin, and from 10 to 50% by weight polyisocyanate.

19. A magnetic recording medium as in claim 1, wherein the binder contains from 30 to 60% by weight cellulosic resin, from 30 to 50% by weight thermoplastic polyurethane elastomer, from 1 to 10% by weight saturated polyester resin, and from 20 to 40% by weight polyisocyanate.

* * * * *